Figure 1:
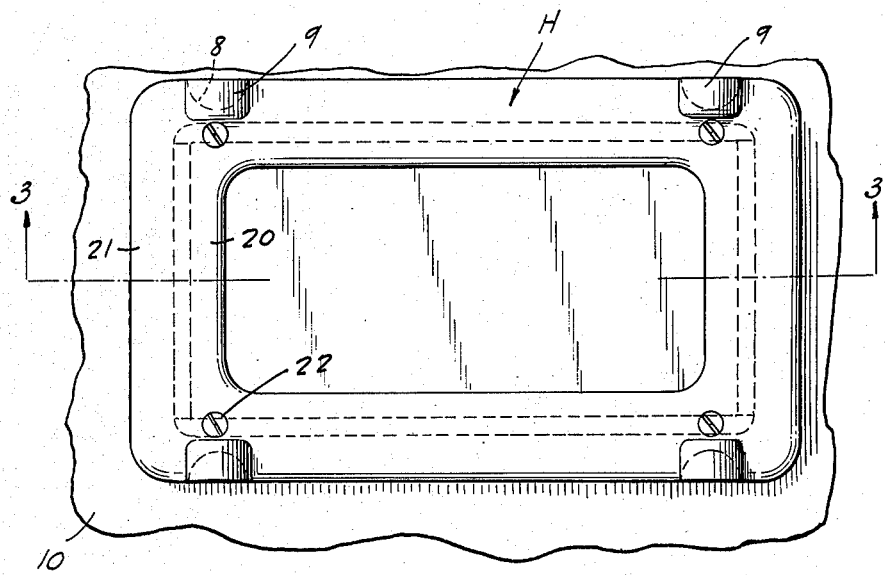

April 4, 1939.  F. M. BOWERS  2,152,865
WELDING SHIELD OR HELMET
Filed April 2, 1938  2 Sheets-Sheet 1

INVENTOR.
FREDERICK M. BOWERS.
BY Joshua R. H. Potts
ATTORNEY.

April 4, 1939.  F. M. BOWERS  2,152,865
WELDING SHIELD OR HELMET
Filed April 2, 1938  2 Sheets-Sheet 2
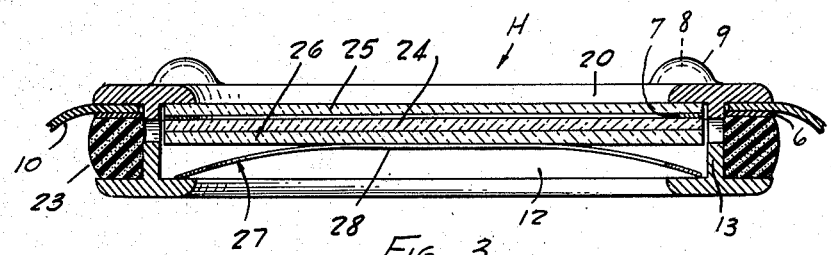
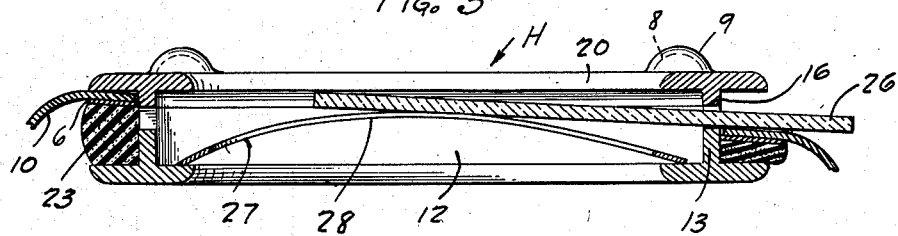
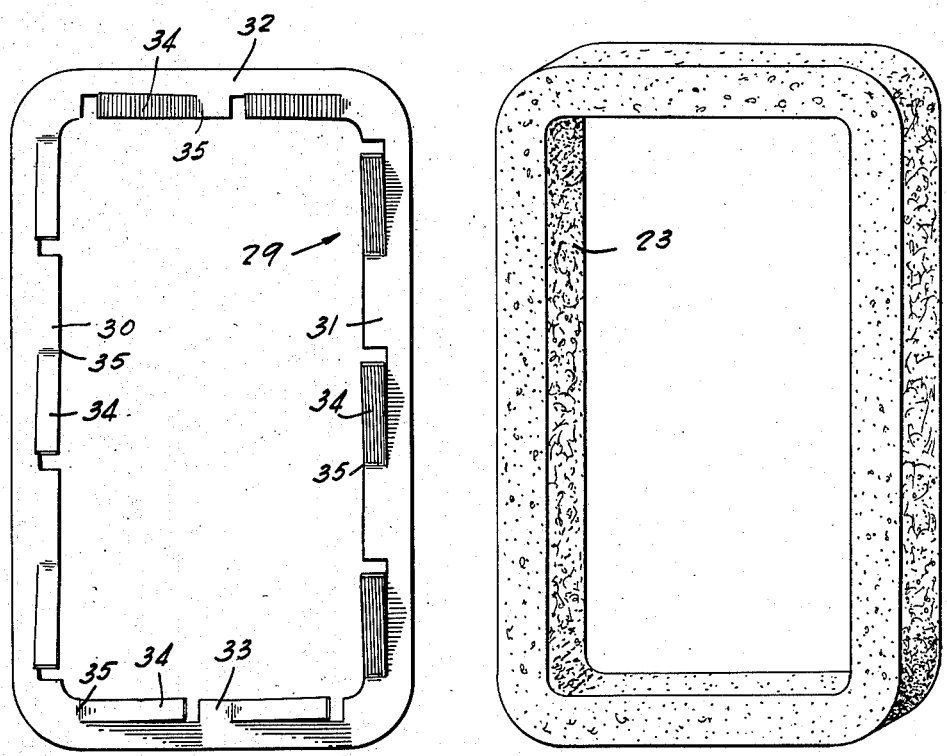
INVENTOR.
FREDERICK M. BOWERS.
BY Joshua R H Potts
ATTORNEY.

Patented Apr. 4, 1939

2,152,865

UNITED STATES PATENT OFFICE 2,152,865

WELDING SHIELD OR HELMET

Frederick M. Bowers, Chester, Pa.

Application April 2, 1938, Serial No. 199,608

14 Claims. (Cl. 2—8)

This invention relates to welding helmets or shields such as are ordinarily employed in conjunction with welding operations for protective purposes.

It is now conventional practice in this art to provide a welding shield or helmet which is formed with a window opening, and carried by the shield or helmet at the window opening is a filter glass holder.

Due to the presence, under conditions of service usage, of flying particles of oxide and metal, it is substantially the universal practice to assemble one or more protective glasses with a filter glass. Thus, the protective glass, which is subject to impingement of flying particles, may be replaced from time to time, and the filter glass holders have been designed not only to accommodate the presence of these several glasses therein, but also for the insertion and removal of the plates which is a necessary incident to the replacement of damaged glasses.

Accordingly the now known designs of welding shields and hemets, including filter glass holders in accordance with the practice above outlined, generally present a holder structure which protrudes from the front of the shield or helmet. Such a protruding structure is generally undesirable in that the likelihood of light leaks is enhanced and also because it is more easily damaged during service usage.

With the foregoing practice and conditions in mind, this invention has in view as its foremost objective the provision of a welding shield or helmet formed with the usual window opening, and which has assembled therewith a filter glass holder, the outer front face of which is, for all effective purposes, substantially flush with the outer surface of the shield or helmet.

In carrying out this idea in a practical embodiment, it is of the utmost importance to provide for the insertion and removal of the glass elements as occasion demands. With the outer face of the glass holder substantially flush with the face of the shield or helmet, it is evident that the main structure of the holder is contained within the shield or helmet, and when so positioned, the structure of the shield or helmet interferes with the insertion or removal of the glass elements.

The invention, therefore, has in view as a further object the provision of a welding shield or helmet formed with the usual window opening, and with which is assembled a filter glass holder, which normally assumes a position in which its outer face is for all effective purposes substantially flush with the outer face of the shield or helmet, but which holder may be moved with respect to the shield or helmet to assume a protruding position in which glass elements may be removed from or inserted into the holder.

Yet another object in view is the provision, in a welding shield or helmet having a filter glass holder assembled therewith in the manner above noted, of yieldable means for normally maintaining the holder retracted within the helmet, and which yieldable means may be overcome to cause the holder to assume its protruding position with respect to the shield or helmet.

A more detailed object in view is the provision of yieldable means which may take the form of a resilient framework that is designed to surround the holder structure and be interposed between a flange on the holder structure and the inner side of the shield or helmet to yieldably maintain the holder in its retracted position. It is evident that this resilient framework may be compressed to cause the holder to assume a protruding position.

Other more detailed objects and advantages of the invention are associated with providing a filter glass holder of appropriate structure for functioning in the above noted manner. These will in part become apparent and in part be hereinafter stated as the description of the invention proceeds.

The invention, therefore, comprises a welding shield or helmet which is formed with the usual window opening, and which has assembled therewith a filter glass holder, which normally assumes a retracted position within the shield or helmet whereby the outer face of the holder is substantially flush with the outer face of the shield or helmet.

Yieldable means is provided for normally maintaining this retracted position, but the effect of this yieldable means may be overcome to cause the holder to assume a protruding position in which glass elements retained therein may be removed or other elements inserted thereinto. This yieldable means may take the form of a resilient framework surrounding the structure of the holder and interposed between the inner face of the shield or helmet and certain structure of the holder.

For a full and more complete understanding of the invention, reference may be had to the following description and accompanying drawings, wherein—

Figure 2:
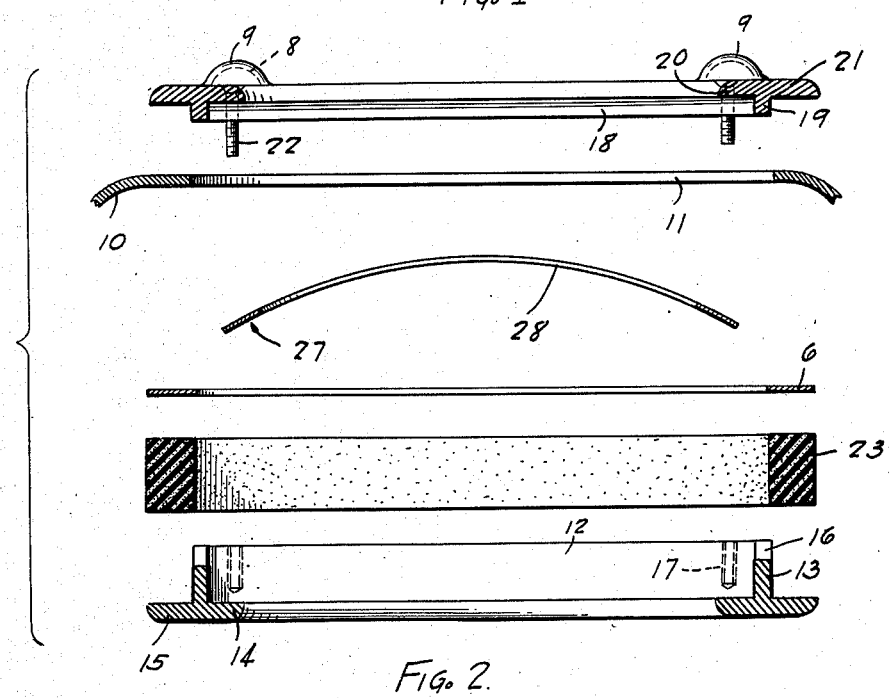

Figure 1 is a front elevational showing of a filter glass holder which is applied to a welding shield or helmet in accordance with the precepts of this invention, Figure 2 is a horizontal sectional view taken through the several elements of a filter glass holder and the shield or helmet with the parts shown in an exploded relationship, Figure 3 is another sectional view taken about on the plane represented by the line 3—3 on Figure 1, developing the holder in its fully retracted position, while Figure 4 is a view similar to Figure 3, developing the position of the holder during insertion or removal of a glass element, Figure 5 is an enlarged detailed view in perspective of one form of resilient means which may be employed for retaining the holder in its retracted position, and Figure 6 is an enlarged detailed plan view of a modified form of retaining means.

Referring now to the drawings, wherein like reference characters denote corresponding parts, a welding shield or helmet is shown fragmentarily and identified by the reference character 10.

Inasmuch as the present invention is concerned solely with that portion of the shield or helmet which is formed with the window opening, no attempt is made to illustrate the entire shield or helmet. It suffices to say that this shield or helmet is formed with a window opening designated 11 (see Figure 2); and in accordance with conventional practice in this art, this window opening 11 will have a rectangular formation although its shape may be varied as occasion demands. Assembled with the shield or helmet 10 and within the window opening 11 is a filter glass holder which is referred to in its entirety by the reference character H in Figure 1.

Referring now more particularly to Figure 2, the holder H is shown as comprising a back body structure consisting of a framework defined by top and bottom walls 12 and side walls 13. The framework made up of these walls 12 and 13 is designed to conform to the dimensions and shape of the window opening 11 and on their inner edges carry inwardly extending flanges 14 and outwardly extending flanges 15. The side walls 13 are cut away as shown at 16 to provide slots when the entire holder structure is assembled in the opening 11, and the top and bottom walls 12 may be formed with screw threaded sockets 17 for a purpose to be hereinafter pointed out.

A complemental body structure identified as the front body structure of the holder H is shown as consisting of top and bottom walls 18 and side walls 19 which correspond in size and shape to the top and bottom walls 12 and side walls 13; and when assembled with the latter, the cut-away portion of the side walls 16 define slots providing access to the interior of the holder. Each of the side walls 19 and top and bottom walls 18 carries an inwardly extending flange 20 and an outwardly extending flange 21.

As shown in the drawings the entire structure of the front body structure comprising walls 18 and 19 and flanges 20 and 21 is preferably integral and may be made of any appropriate material which is susceptible to the molding operations necessary to form the entire structure. The invention has particularly in mind the use of a phenol condensation product, and the same thing is true for the wall and flange structure of the back body structure.

Formed at convenient points on the outer flanges 21 of the top and bottom walls 18, and preferably molded integrally therewith, are enlargements 9 that are cored or hollowed out, as shown at 8, to provide recesses that are intended to constitute finger grips for a purpose to be hereinafter pointed out.

The top and bottom walls 18 and side walls 19 are snugly received within the window opening 11 with the outer flanges 21 overlying and engaging the front face of the shield or helmet 10; and in order to obtain a substantially smooth and flush outer face, the edges of the flanges 20 and 21 are preferably rounded off as shown in the several views of the drawings.

Headed screw fastening elements 22 pass through openings in the top and bottom walls 18 and are screwed into the threaded socket 17 to assemble the front structure with the back structure, and when so assembled, a means is interposed between the outer flanges 15 and inner face of the shield or helmet 10 about the opening 11 to yieldably maintain the holder in position in the manner depicted in Figure 3, and as a preferred means, the invention has in view a framework 23 of a resilient material such as an appropriate sponge rubber composition. This framework 23 is intended to snugly encompass the top and bottom walls 12 and side walls 13.

While not an essential element, a gasket 6, such as one made of steel, is shown as positioned between the rubber framework 23 and the wall 10 of the shield or helmet.

One of these filter glass holders H is ordinarily designed to accommodate three glass elements such as shown in Figure 3, the usual arrangement being to provide a filter glass designated 24, on each side of which is disposed a protective glass such as shown at 25 and 26. A gasket 7, of any desired material such as fibre, may be interposed between the filter glass 24 and protective glass 25. When in the holder, the glasses are maintained in assembled relationship and urged against the inner faces of the flanges 20 by a spring device shown at 27. These spring devices 27 are old and well known in the art and are generally of a rectangular formation with the longitudinally extending side pieces 28 assuming the bowed formation illustrated, and which bowed side pieces are in engagement with the protective glass 26 as shown in Figure 3.

Assuming the filter glass holder H to be positioned in the window 11 of a shield or helmet 10 in the manner depicted in Figure 3, it is evident that should it be necessary to remove one or more of the glass elements 24, 25, and 26 that one side of the resilient framework 23 might be compressed by availing of the finger grips 8 on that side and, as shown in Figure 4, one of the slots 16 is moved out beyond the front face of the shield or helmet. When so disposed, a glass element may be passed through the slot in the manner shown in Figure 4. Thus if after continued periods of usage the protective glass 25 should be damaged by the impingement of flying particles of metal and oxide thereagainst, it may be readily replaced by bringing one of the slots 16 into this position as represented at Figure 4.

The invention has in view the use of a modified form of resilient framework, such a modified form being shown in Figure 6. In this view the rubber framework is replaced by a spring framework referred to in its entirety by the reference character 29. This framework 29 has side pieces 30 and 31 corresponding to the top and bottom walls 12 and end pieces 32 and 33 corresponding to the side walls 13. Each of these pieces 30, 31, 32, and 33 of the framework 29 has formed thereon, preferably on the inner edge, a plurality of leaf spring members 34, each of which is integrally connected to the framework as shown at 35. These spring members may be formed by being struck from the framework 29 in a well known manner. It is evident that this framework 29 may be positioned with the several pieces 31, 32, and 33 engaging the wall of the shield or helmet 10 about the opening 11 with the free extremities of the spring members engaging the outer flanges 15 to yieldably retain the holder in its retracted position, or if occasion demands, the position of the framework 29 could be reversed.

It is evident that when the shield or helmet is in effective position protecting the face of the wearer, compressive tension on either of the frameworks 23 or 29 will be released, thus causing the holder H to assume a retracted position within the shield or helmet in which the slots 16 are closed as by the rubber framework 23 in the manner depicted in Figure 3. It is only when the shield or helmet is in an inoperative position off the head of the wearer that the finger grips 8 will ordinarily be availed of to compress one of the frameworks 23 or 29 to bring the corresponding slot 16 into an open position in which a glass plate element may be passed therethrough.

While preferred specific embodiments of the invention are hereinbefore set forth it is to be clearly understood that I am not to be limited to the exact constructions illustrated and described, because various modifications of these details may be provided in putting the invention into practice within the purview of the appended claims.

I claim:

1. In combination, a welding shield or helmet formed with a window opening, a filter glass holder assembled with the shield or helmet within the window opening and having portions disposed within and without the helmet, and means for yieldably maintaining said holder in a position in which the major part thereof is retracted within the shield or helmet.

2. In combination, a welding shield or helmet formed with a window opening, a filter glass holder having a flange structure adapted to overlie and engage the outer face of the shield or helmet about the window opening, said holder also including flange structure disposed within the shield or helmet and spaced from the inner face thereof about the window opening, and yieldable means interposed between last said mentioned flange structure and the inner face of the shield or helmet for maintaining the first mentioned flange structure in engagement with the front face of the shield or helmet.

3. In combination, a welding shield or helmet formed with a window opening, a filter glass holder assembled with the shield or helmet within the window opening, said helmet having a portion extending into the helmet, said holder also being movable with respect to the helmet to vary the extent of the portion disposed therewithin; and resilient means for maintaining said holder in a position in which the maximum portion of the holder is retracted within the shield or helmet.

4. In combination, a welding shield or helmet formed with a window opening, a filter glass holder within said window opening, and a resilient framework encompassing the holder and engaging the inner face of the shield or helmet about the window opening, said resilient framework also engaging structure in the filter glass holder to yieldably maintain same in a position in which the major portion of the holder is retracted within the shield or helmet.

5. In combination, a welding shield or helmet formed with a window opening, a filter glass holder including front flange structure adapted to overlie and engage the front face of the shield or helmet about the window opening, said holder including additional flange structure within the shield or helmet and spaced from the inner face of the shield or helmet, and a resilient framework interposed between said last mentioned flange structure and the inner face of the shield or helmet for maintaining the front flange structure in engagement with the front face of the shield or helmet.

6. In combination, a welding shield or helmet formed with a window opening, a filter glass holder consisting of structure formed with a slot through which a glass plate element may be passed, and means for yieldably maintaining said holder in a position in which the said structure formed with the slot is retracted within the helmet whereby the slot is closed, but which yieldable means may be overcome to move the holder into a protruding position in which said slot is opened.

7. In combination, a welding shield or helmet formed with a window opening, a filter glass holder within said opening and consisting of structure formed with a slot through which a glass plate element may be passed, means for yieldably maintaining said holder in a retracted position, closing said slot, and means on the filter glass holder constituting a finger grip.

8. A filter glass holder assembly of the character described comprising top, bottom, and side walls, one of said side walls being provided with a slot, inwardly and outwardly extending flanges on the front edges of said top, bottom, and side walls, outwardly extending flanges on the inner edges of said top, bottom, and side walls, and a resilient framework adapted to encompass said top, bottom, and side walls, in a position in engagement with the flanges at the inner edges and with the inner face of a shield or helmet with which a holder may be assembled.

9. A filter glass holder assembly of the character described comprising top, bottom, and side walls defining a framework adapted to be received in a window opening of a welding shield or helmet, the front edges of said top, bottom, and side walls carrying outwardly extending flanges which are adapted to engage the front face of the welding shield or helmet about the window opening therein, said top, bottom, and side walls carrying outwardly extending flanges at the rear edges, resilient means carried by said top, bottom, and side walls and adapted to engage said last mentioned flanges to urge the first mentioned flange structure into engagement with the front face of the welding shield or helmet, one of said side walls being formed with a slot through which a glass element is adapted to be passed, and means carried by said top, bottom, and side walls for maintaining a filter glass assembly in position therewithin.

10. A filter glass holder assembly of the character described comprising top, bottom, and side walls defining a framework adapted to be received in a window opening of a welding shield or helmet, the front edges of said top, bottom, and side walls carrying outwardly extending flanges which are adapted to engage the front face of the welding shield or helmet about the window opening therein, said top, bottom, and side walls carrying outwardly extending flanges at the rear edges, resilient means carried by said top, bottom, and side walls, and adapted to engage said last mentioned flanges to urge the first mentioned flange structure into engagement with the front face of the welding shield or helmet, one of said side walls being formed with a slot through which a glass element is adapted to be passed, and means carried by said top, bottom, and side walls for maintaining a filter glass assembly in position therewithin, said means comprising inwardly extending flanges at said outer and inner edges of the said top, bottom, and side walls, and a leaf spring in engagement with the inner extending flanges at the inner edge.

11. A filter glass holder assembly of the character described comprising top, bottom, and side walls defining a framework adapted to be received in a window opening of a welding shield or helmet, the front edges of said top, bottom, and side walls carrying outwardly extending flanges which are adapted to engage the front face of the welding shield or helmet about the window opening therein, said top, bottom, and side walls carrying outwardly extending flanges at the rear edges, a framework of sponge rubber composition carried by said top, bottom, and side walls and adapted to engage said last mentioned flanges to urge the first mentioned flange structure into engagement with the front face of the welding shield or helmet, one of said side walls being formed with a slot through which a glass element is adapted to be passed, and means carried by said top, bottom, and side walls for maintaining a filter glass assembly in position therewithin, said means comprising inwardly extending flanges at said outer and inner edges of the said top, bottom, and side walls, and a leaf spring in engagement with the inner extending flanges at the inner edge.

12. A filter glass holder assembly of the character described comprising top, bottom, and side walls defining a framework adapted to be received in a window opening of a welding shield or helmet, the front edges of said top, bottom, and side walls carrying outwardly extending flanges which are adapted to engage the front face of the welding shield or helmet about the window opening therein, said top, bottom, and side walls carrying outwardly extending flanges at the rear edges, a metallic framework formed with leaf spring elements carried by said top, bottom, and side walls and adapted to engage said last mentioned flanges to urge the first mentioned flange structure into engagement with the front face of the welding shield or helmet, one of said side walls being formed with a slot through which a glass element is adapted to be passed, and means carried by said top, bottom, and side walls for maintaining a filter glass assembly in position therewithin, said means comprising inwardly extending flanges at said outer and inner edges of the said top, bottom, and side walls, and a leaf spring in engagement with the inner extending flanges at the inner edge.

13. In combination, a welding shield or helmet formed with a window opening, a filter glass holder assembled with the shield or helmet within said window opening and comprising structure formed with a slot through which a glass plate element may be passed, and means for yieldably maintaining said holder in a position in which the said structure formed with the slot is retracted within the helmet, said means constituting a closure for said slot when the holder is in a retracted position.

14. In combination, a welding shield or helmet formed with a window opening, a filter glass holder assembled with the shield or helmet within said window opening and comprising structure formed with a slot through which a glass plate element may be passed, and a framework of sponge rubber encompassing said structure and normally urging said holder into a retracted position within the shield or helmet, said rubber framework constituting a closure for the said slot when the holder is in a retracted position.

FREDERICK M. BOWERS.